United States Patent
Steckler

(10) Patent No.: US 9,378,664 B1
(45) Date of Patent: Jun. 28, 2016

(54) PROVIDING FINANCIAL DATA THROUGH REAL-TIME VIRTUAL ANIMATION

(75) Inventor: Ryan Michael Steckler, Escondido, CA (US)

(73) Assignee: INTUIT INC., Mountain View, CA (US)

( * ) Notice: Subject to any disclaimer, the term of this patent is extended or adjusted under 35 U.S.C. 154(b) by 461 days.

(21) Appl. No.: 12/573,464

(22) Filed: Oct. 5, 2009

(51) Int. Cl.
*G09F 1/00* (2006.01)
*H04B 7/00* (2006.01)

(52) U.S. Cl.
CPC .... *G09F 1/00* (2013.01); *H04B 7/00* (2013.01)

(58) Field of Classification Search
CPC ........... G06T 15/00; G06T 15/70; G09F 1/00; H04B 7/00
See application file for complete search history.

(56) References Cited

U.S. PATENT DOCUMENTS

| | | | | |
|---|---|---|---|---|
| 6,282,365 | B1 * | 8/2001 | Gotoh et al. | 386/240 |
| 6,726,094 | B1 * | 4/2004 | Rantze et al. | 235/379 |
| RE38,801 | E * | 9/2005 | Rogers | 379/91.01 |
| 7,356,477 | B1 * | 4/2008 | Allan et al. | 705/14.4 |
| 7,471,890 | B2 * | 12/2008 | Lee et al. | 396/287 |
| 2002/0024590 | A1 * | 2/2002 | Pena | 348/14.08 |
| 2002/0198826 | A1 * | 12/2002 | Wasserman et al. | 705/39 |
| 2003/0061080 | A1 * | 3/2003 | Ross | 705/6 |
| 2004/0169722 | A1 * | 9/2004 | Pena | 348/14.01 |
| 2004/0174367 | A1 * | 9/2004 | Liao | G06T 13/20 345/473 |
| 2005/0247777 | A1 * | 11/2005 | Pitroda | 235/380 |
| 2006/0169766 | A1 * | 8/2006 | Hoch | 235/379 |
| 2007/0142112 | A1 * | 6/2007 | Hobmeier et al. | 463/29 |
| 2007/0170238 | A1 * | 7/2007 | Piersol et al. | 235/375 |
| 2008/0044085 | A1 * | 2/2008 | Yamamoto | 382/190 |
| 2008/0071637 | A1 * | 3/2008 | Saarinen et al. | 705/26 |
| 2008/0191008 | A1 * | 8/2008 | Manfredi et al. | 235/379 |
| 2009/0259557 | A1 * | 10/2009 | Carroll et al. | 705/17 |
| 2009/0327111 | A1 * | 12/2009 | Bulawa et al. | 705/34 |
| 2010/0078290 | A1 * | 4/2010 | Chang | 194/206 |
| 2010/0278453 | A1 * | 11/2010 | King | 382/321 |
| 2010/0306111 | A1 * | 12/2010 | Slater et al. | 705/45 |
| 2012/0036745 | A1 * | 2/2012 | Chen | B42D 15/027 40/124.01 |

FOREIGN PATENT DOCUMENTS

WO    WO 2008089395 A2 *  7/2008 ............. G06Q 40/00

OTHER PUBLICATIONS

City of Chicago; Department of Revenue: News release Dec. 3, 2007 by Ed Walsch: "Chicago Department of Revenue Announces New Payment Kiosks"; 3 pages.*

* cited by examiner

*Primary Examiner* — Elda Milef
*Assistant Examiner* — Mary Gregg
(74) *Attorney, Agent, or Firm* — Patterson & Sheridan, LLP

(57) ABSTRACT

One embodiment of the present invention provides a system that provides data associated with a financial instrument through real-time virtual animation anchored to the financial instrument in a video stream. During operation, the system receives at a computer system a video stream, wherein the video stream includes an image of a financial instrument, and wherein a financial instrument is a physical object that is associated with at least one of a financial account and financial data. Next, the system identifies the financial instrument in the video stream. The system then retrieves data associated with the financial instrument from a data source. Next, the system creates an animation which displays the data. Once the animation is created, the system anchors the animation to the financial instrument in the video stream. Finally, the system displays the video stream which includes the animation to a user.

18 Claims, 3 Drawing Sheets

COMPUTING ENVIRONMENT 100

PROVIDING FINANCIAL DATA THROUGH REAL-TIME VIRTUAL ANIMATION

BACKGROUND

Related Art

Humans are excellent at interacting with physical objects, like pieces of paper. They can deftly move them around on a desk, fold them, and put them in their pockets or notebooks. Physical objects "feel" good, and people like holding physical objects, such as printed photos, and they like reading physical books.

One of the limitations of physical objects is that they can only hold a finite amount of static data. Only so much text can fit on a sheet of paper, and the paper can present only one static view of the text. Computers help users overcome these limitations by presenting data in various dynamic formats that can change and evolve based on the user's preferences. However, the user no longer benefits from the intuitive tactile experience associated with manipulating a physical object.

SUMMARY

One embodiment of the present invention provides a system that provides data associated with a financial instrument through real-time virtual animation anchored to the financial instrument in a video stream. During operation, the system receives at a computer system a video stream, wherein the video stream includes an image of a financial instrument, and wherein a financial instrument is a physical object that is associated with at least one of a financial account and financial data. Next, the system identifies the financial instrument in the video stream. The system then retrieves data associated with the financial instrument from a data source. Next, the system creates an animation which displays the data. Once the animation is created, the system anchors the animation to the financial instrument in the video stream. Finally, the system displays the video stream which includes the animation to a user.

In some embodiments of the present invention, the data source can include at least one of: a personal information manager; an accounting system; a centralized database; a network service; or a web-based application.

In some embodiments of the present invention, the data source can include the financial instrument, wherein information is extracted from the financial instrument via an optical character recognition (OCR) process.

In some embodiments of the present invention, identifying the financial instrument in the video stream involves performing an optical recognition process on the financial instrument.

In some embodiments of the present invention, identifying the financial instrument in the video stream involves performing an OCR process on a set of characters on the financial instrument.

In some embodiments of the present invention, the system identifies a second financial instrument in the video stream. Finally, the system retrieves data associated with a combination of the financial instrument and the second financial instrument from the data source.

In some embodiments of the present invention, the system identifies a second financial instrument in the video stream. In these embodiments, the system only displays the animation when the second financial instrument is present in the video stream.

In some embodiments of the present invention, the second financial instrument can include the user.

In some embodiments of the present invention, the system identifies a motion of the financial instrument in the video stream. Next, the system determines an action associated with the motion. Finally, the system performs the action on one of the financial account and the financial data.

DETAILED DESCRIPTION

Figure 1A:
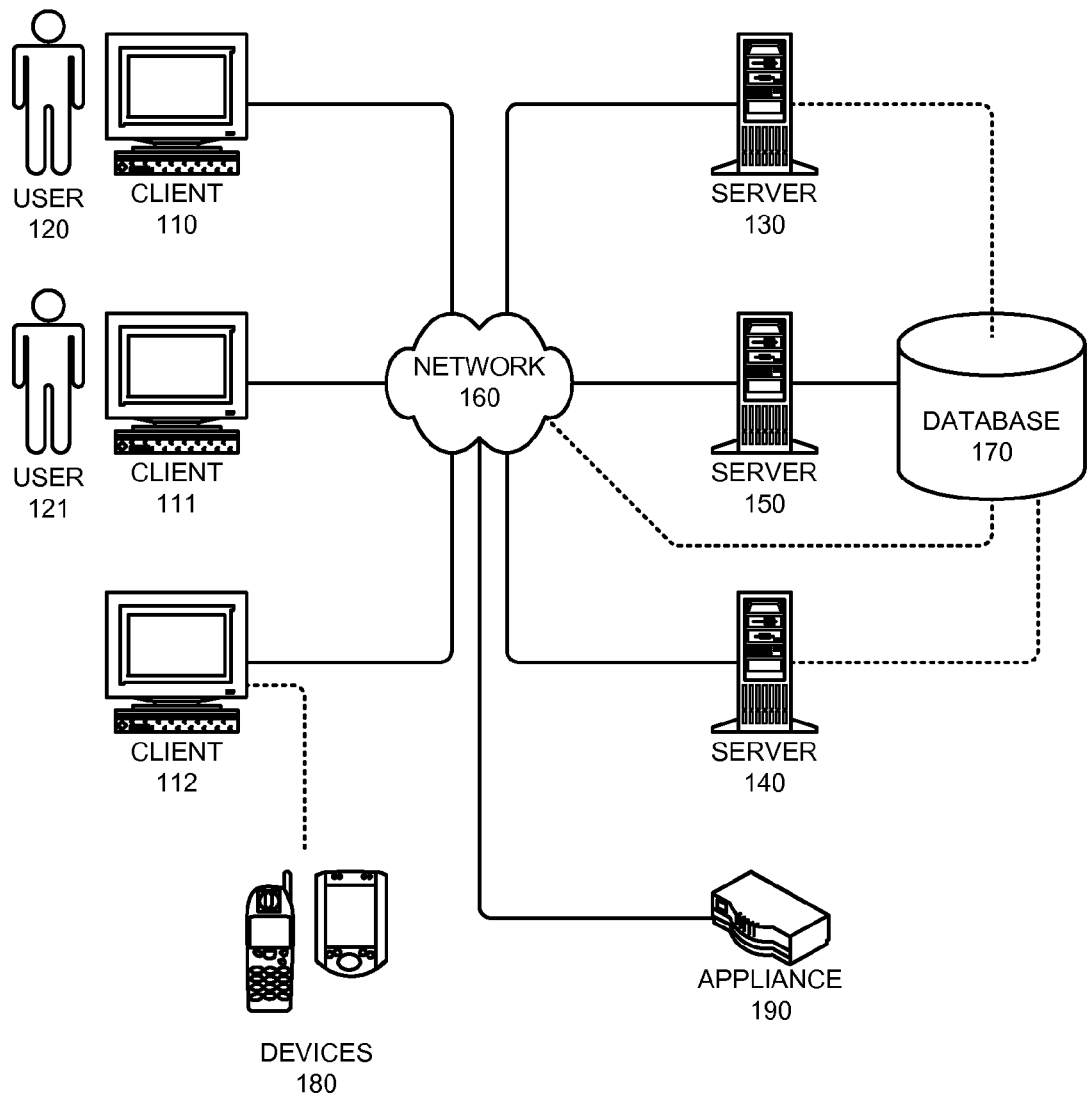
FIG. 1A illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that provides data associated with a financial instrument through real-time virtual animation anchored to the financial instrument in a video stream. During operation, the system receives at a computer system a video stream, wherein the video stream includes an image of a financial instrument, and wherein a financial instrument is a physical object that is associated with at least one of a financial account and financial data.

For example, the financial instrument could be a credit card associated with a credit account, an ATM card associated with a checking or savings account, a W2 form that reports an employee's earnings for the year from a particular employer, or any other object that has an association with financial data.

Next, the system identifies the financial instrument in the video stream, such as a credit card. The system then retrieves data associated with the financial instrument from a data source. Note that retrieving the financial data can include accessing accounting and/or personal management software on the user's computer, retrieving the information from the user's bank or brokerage house, or retrieving the information from any other repository or service accessible from the user's computer or a server coupled to the user's computer.

Next, the system creates an animation which displays the data. Once the animation is created, the system anchors the animation to the financial instrument in the video stream. Finally, the system displays the video stream with the animation to a user.

For example, if the user holds up a credit card to the web camera on his or her computer, the system displays to the user the video including the user holding the credit card. The system then recognizes the credit card and accesses financial data associated with the credit card. Next, the system builds an animation representing the financial data, such as a three-dimensional pie chart categorizing the purchases made with the credit card. Finally, the system displays this three-dimensional pie chart in the video feed attached to the credit card. Note that the three-dimensional pie chart could be displayed over the top of the credit card or next to the credit card. What is important is that there is some visual association between the three-dimensional pie chart and the credit card.

In some embodiments of the present invention, the data source can include at least one of: a personal information manager; an accounting system; a centralized database; a network service; or a web-based application. As mentioned previously, any source of financial data that is accessible by the computer system, or by a server or appliance coupled to the computer system, may be used. In some embodiments of the present invention, data is retrieved from multiple sources and the data is then combined into one data source.

In some embodiments of the present invention, the data source can include the financial instrument, wherein information is extracted from the financial instrument via an optical character recognition (OCR) process. For example, in the case of a W2 form, the system may read identifying numbers from the W2 form via an OCR process. Upon performing the OCR process on the W2 form, the system can use the W2 form itself as the data source, animating the data contained in the W2 form.

In some embodiments of the present invention, identifying the financial instrument in the video stream involves performing an optical recognition process on the financial instrument. For example, in the case of the W2 form, the system may take the image of the W2 form and compare it against a database of documents to determine that the financial instrument is indeed a W2 form.

In some embodiments of the present invention, identifying the financial instrument in the video stream involves performing an OCR process on a set of characters on the financial instrument. For example, the system may determine through an optical recognition process that the financial instrument is an ATM card. However, the system would not know at this point which ATM card the user is presenting. The system can leverage an OCR process by determining the number printed on the ATM card. Once the system has determined the numbers, the system can then positively identify the ATM card.

In some embodiments of the present invention, the system identifies a second financial instrument in the video stream. Finally, the system retrieves data associated with a combination of the financial instrument and the second financial instrument from the data source.

For example, the user may hold up multiple 1099-INT forms that he or she received from different banks. The system then animates the financial data associated with the 1099-INTs. Note that the system may animate each dataset separately, and/or the system may animate a combination of the datasets. Note that the system can work with any number of financial instruments that can be displayed simultaneously in the video stream, as long as there is enough detail to identify the financial instruments.

In some embodiments of the present invention, the system identifies a second financial instrument in the video stream. Finally, the system displays the video stream with the animation by only displaying the animation when the second financial instrument is present in the video stream.

For example, the system may not display the information for a particular credit card unless a bank statement associated with the credit card is displayed simultaneously. Furthermore, the system may not display the information for a particular W2 form unless the accompanying Social Security card is displayed. These embodiments can facilitate enhanced security because the user would need multiple associated financial instruments.

In some embodiments of the present invention, the second financial instrument can include the user. For example, unless the system recognizes the face of the user in the video stream, the system may not display any financial information associated with the user.

In some embodiments of the present invention, the system identifies a motion of the financial instrument in the video stream. Next, the system determines an action associated with the motion. Finally, the system performs the action on one of the financial account and the financial data.

For example, the system may identify a shaking motion wherein the user shook the financial instrument. In response to the shaking motion, the system can perform an action such as switching to the next animation in a set of animations. Note that virtually any action that can be performed by the system can be associated with a motion or gesture.

Computing Environment

FIG. 1A illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1A, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

Figure 1B:
FIG. 1B illustrates a financial instrument in accordance with an embodiment of the present invention.

FIG. 1B illustrates financial instrument 198 in accordance with an embodiment of the present invention. As illustrated, financial instrument 198 is a credit card from Main Street Bank. Note that financial instrument 198 can include any physical object that has an association with financial data, such as a bank statement, a tax form, or a check.

System

Figure 2:
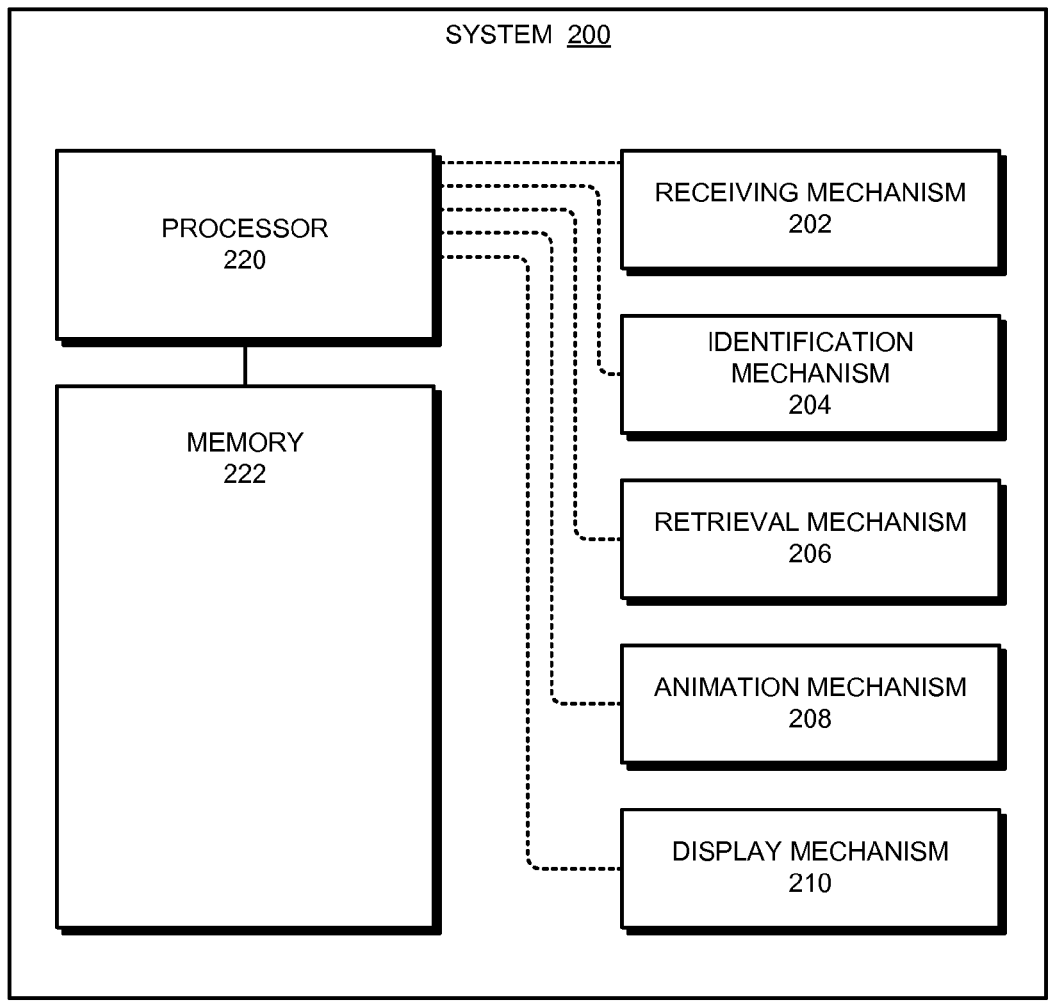
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, identification mechanism 204, retrieval mechanism 206, animation mechanism 208, display mechanism 210, processor 220, and memory 222. Note that system 200 also includes a web camera or any other type of video input device capable of creating a digitized video stream.

Performing Real-Time Virtual Animation

Figure 3:
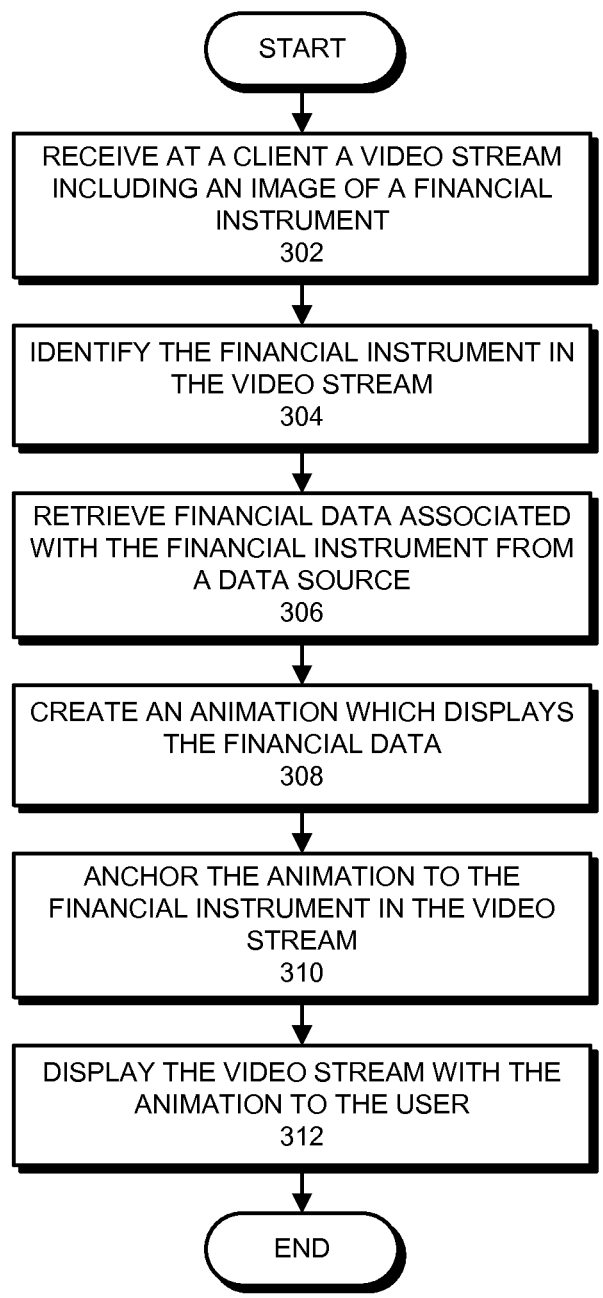
FIG. 3 presents a flow chart illustrating the process of performing real-time virtual animation in accordance with an embodiment of the present invention.

FIG. 3 presents a flow chart illustrating the process of performing real-time virtual animation in accordance with an embodiment of the present invention. During operation, receiving mechanism 202 receives at client 110 a video stream, wherein the video stream includes an image of financial instrument 198, and wherein financial instrument 198 is a physical object that is associated with at least one of a financial account or financial data (operation 302). Next, identification mechanism 204 identifies financial instrument 198 in the video stream (operation 304). Retrieval mechanism 206 then retrieves financial data associated with financial instrument 198 from a data source (operation 306). Note that this data source can reside on client 110, server 150, database 170, appliance 190, financial instrument 198, or any combination thereof.

Next, animation mechanism 208 creates an animation which displays the financial data to user 120 (operation 308). Furthermore, animation mechanism 208 anchors the animation to financial instrument 198 in the video stream (operation 310). Finally, display mechanism 210 displays the video stream with the animation to user 120 (operation 312).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing data associated with a financial instrument for a user through real-time virtual animation anchored to the financial instrument in a video stream, the method comprising:

receiving, at a computer system, from a camera for the computer system, a video stream comprising a video frame, wherein the video frame includes an image of the financial instrument, wherein the image includes information that identifies at least one of a financial account for the user and financial data for the user, wherein the financial instrument is a physical object that includes the information, and wherein the video stream is received from the camera as the user holds the financial instrument up to the camera;

identifying the financial instrument in the video stream by performing optical character recognition on the image to extract second data, the second data comprising at least some of the information that identifies the at least one of the financial account and the financial data;

using the second data to retrieve, from a data source, one or more monetary amounts for the at least one of the financial account and the financial data;

creating an animation which graphically represents the one or more monetary amounts;

modifying the video frame to include the animation such that, in the modified video frame, the animation is attached to the image of the financial document;

and displaying the modified video frame to the user at the computer system.

2. The computer-implemented method of claim 1, wherein the data source can include at least one of:

a personal information manager;

an accounting system;

a centralized database;

a network service; and a web-based application.

3. The computer-implemented method of claim 1, wherein the data source can include the financial instrument.

4. The computer-implemented method of claim 1, further comprising:

identifying a motion of the financial instrument in the video stream;

determining an action associated with the motion; and performing the action on one of the financial account and the financial data.

5. The computer-implemented method of claim 4, wherein the motion comprises shaking the financial instrument in the video stream, and wherein the action comprises switching to a next animation in a set of animations that comprises the animation.

6. The computer-implemented method of claim 1, further comprising:
at the computer system, recognizing whether the video stream comprises a face of the user;
wherein including the animation in the video stream comprises:
when the face of the user is recognized in the video stream, including the animation in the video stream; and
otherwise, when the face of the user is not recognized in the video stream, displaying the video stream without displaying financial information for the user in the video stream.

7. The computer-implemented method of claim 6, wherein the video stream is received from the user, and wherein the user is a human being.

8. The computer-implemented method of claim 6, wherein the financial information includes the animation.

9. The computer-implemented method of claim 1, further comprising:
determining a type for the financial instrument by comparing the image of the financial instrument to a database of documents;
wherein identifying the financial instrument in the video stream comprises, in response to determining the type of the financial instrument, determining an identifier for the financial instrument by performing the optical recognition; and
wherein retrieving one or more monetary amounts comprises using the identifier for the financial instrument.

10. The computer-implemented method of claim 1, wherein the user is a human being.

11. A computer-readable storage medium storing instructions that when executed by a computer cause the computer to perform a method for providing data associated with a financial instrument for a user, the method comprising:
at a computer system, while the user holds the financial instrument up to a camera coupled to the computer system, receiving a video stream from the camera, wherein the video stream comprises a set of video frames, each of the video frames including a corresponding image of the financial instrument captured by the camera as the user holds the financial instrument up to the camera, wherein the financial instrument is a physical object that includes information that identifies at least one of a financial account for the user and financial data for the user;
identifying the financial instrument in the video stream by performing optical character recognition on at least one of the images of the financial instrument in the video frames to extract second data, the second data comprising at least some of the information that identifies the at least one of the financial account and the financial data;
using the second data to retrieve, from a data source, one or more monetary amounts for the at least one of the financial account and the financial data;
creating a real-time virtual animation that graphically represents the one or more monetary amounts;
for each video frame in the set of video frames, modifying the video frame to include the animation such that, in the modified video frame, the animation is attached to the image of the financial document in the video frame; and
displaying the modified video frames to the user at the computer system.

12. The computer-readable storage medium of claim 11, wherein the data source can include at least one of:
a personal information manager;
an accounting system;
a centralized database;
a network service; and
a web-based application.

13. The computer-readable storage medium of claim 11, wherein the data source can include the financial instrument.

14. The computer-readable storage medium of claim 11, wherein the method further comprises:
identifying a second financial instrument in the video stream; and
retrieving data associated with a combination of the financial instrument and the second financial instrument from the data source.

15. The computer-readable storage medium of claim 11, wherein the method further comprises:
identifying a second financial instrument in the video stream; and wherein displaying the video stream with the animation involves only displaying the animation when the second financial instrument is present in the video stream.

16. The computer-readable storage medium of claim 11, wherein the method further comprises:
identifying a motion of the financial instrument in the video stream;
determining an action associated with the motion; and
performing the action on one of the financial account and the financial data.

17. The computer-implemented method of claim 11, wherein displaying the second video stream comprises
displaying the real-time virtual animation anchored to the images of the financial instrument captured by the camera while the user holds the financial instrument up to the camera, and wherein the user is a human being.

18. An apparatus configured to provide data associated with a financial instrument for a user through real-time virtual animation anchored to the financial instrument in a video stream, comprising:
a processor;
a memory;
a camera;
a receiving mechanism configured to receive, at a computer system, from the camera, a video stream comprising a video frame, wherein the video frame includes an image of the financial instrument, wherein the image includes information that identifies at least one of a financial account for the user and financial data for the user, wherein the financial instrument is a physical object that includes the information, and wherein the video stream is received from the camera as the user holds the financial instrument up to the camera;
an identification mechanism configured to identify the financial instrument in the video stream by performing optical character recognition on the image to extract second data, the second data comprising at least some of the information that identifies the at least one of the financial account and the financial data;
a retrieval mechanism configured to use the second data to retrieve, from a data source, one or more monetary amounts for the at least one of the financial account and the financial data;
an animation mechanism configured to create an animation which graphically represents the one or more monetary amounts, wherein the animation mechanism is further configured to conditionally include the animation in the video stream;

a mechanism configured to modify the video frame to include the animation such that, in the modified video frame, the animation is attached to the image of the financial document; and a display mechanism configured to display the modified video frame to the user at the computer system.

* * * * *